(12) United States Patent
Sieben (10) Patent No.: US 9,095,092 B2
(45) Date of Patent: Aug. 4, 2015

(54) ATTACHMENT FOR LATERALLY SHIFTING A WORKING IMPLEMENT

(76) Inventor: Irwin Sieben, Macklin (CA)

( * ) Notice: Subject to any disclaimer, the term of this patent is extended or adjusted under 35 U.S.C. 154(b) by 551 days.

(21) Appl. No.: 13/328,491

(22) Filed: Dec. 16, 2011

(65) Prior Publication Data

US 2012/0328401 A1  Dec. 27, 2012

(30) Foreign Application Priority Data

Dec. 16, 2010 (CA) ...................................... 2725694

(51) Int. Cl.
*A01D 34/04* (2006.01)
*A01D 42/00* (2006.01)
*A01D 34/835* (2006.01)
*B62D 49/02* (2006.01)

(52) U.S. Cl.
CPC .............. *A01D 42/00* (2013.01); *A01D 34/835* (2013.01); *A01D 34/04* (2013.01); *B62D 49/02* (2013.01)

(58) Field of Classification Search
CPC .... A01B 69/06; A01B 69/00; A01D 2101/00; A01D 67/00; A01D 34/42; A01D 34/661; A01D 87/0023; A01D 34/04; A01D 34/84; A01D 34/863; A01D 34/866; A01D 41/14; B60D 1/00; B60D 7/00; B60D 1/14; B66C 23/00; E02F 5/02; E02F 3/85; F15B 15/00; F01B 15/02
USPC .............. 37/103, 243; 91/217; 92/13.41, 117, 92/118, 161; 172/6, 23, 26, 98, 121, 324, 172/436, 476–478, 552, 595, 667, 679, 172/817; 280/447, 456, 460, 463, 468, 477, 280/486; 414/695, 705, 728; 56/13.8, 14.9, 56/15.4–15.9, 17.2
See application file for complete search history.

(56) References Cited

U.S. PATENT DOCUMENTS

| 3,992,007 | A | | 11/1975 | Friedebach |
| 3,993,206 | A | | 11/1976 | Jomen et al. |
| 4,020,745 | A | | 5/1977 | Iijima et al. |
| 4,113,031 | A | | 9/1978 | Venable |
| 4,162,087 | A | | 7/1979 | Avrillon |
| 4,239,085 | A | | 12/1980 | Venable et al. |
| 4,318,445 | A | | 3/1982 | Schuck |
| 4,463,811 | A | | 8/1984 | Winter |
| 4,552,224 | A | | 11/1985 | Luscombe |
| 5,956,932 | A | * | 9/1999 | Schmidt .......................... 56/15.6 |
| 6,076,341 | A | * | 6/2000 | Gummerson ................... 56/17.2 |

(Continued)

FOREIGN PATENT DOCUMENTS

| CA | 1153201 | 9/2006 |
| GB | 2099787 | 10/1981 |

*Primary Examiner* — Saul Rodriguez
*Assistant Examiner* — Ronald Jarrett
(74) *Attorney, Agent, or Firm* — Olive Law Group, PLLC (57) ABSTRACT

An attachment for laterally shifting a working implement is provided. The attachment can have a primary frame having a first side and a second side, the primary frame can be connectable to the vehicle so that the primary frame extends substantially perpendicular to the vehicle. A secondary frame can have a first side and a second side and be moveably connected to the primary frame so that the secondary frame can move laterally relative to the vehicle. An extension frame can have a first side and a second side and be moveably connected to the secondary frame so that the extension frame can move laterally relative to the vehicle. A working implement, such as a mower, can be operably connectable to the extension frame so that the working implement can be shifted laterally relative to the vehicle using the attachment.

19 Claims, 10 Drawing Sheets

(56) References Cited

U.S. PATENT DOCUMENTS

| | | | |
|---|---|---|---|
| 7,011,487 B2 * | 3/2006 | Kafka et al. | 414/663 |
| 7,555,884 B2 * | 7/2009 | Janning | 56/15.4 |
| 7,690,177 B2 | 4/2010 | Spitzley | |
| 2012/0328401 A1 | 12/2012 | Sieben | |

* cited by examiner

ATTACHMENT FOR LATERALLY SHIFTING A WORKING IMPLEMENT

The present invention relates to an attachment mechanism for connecting a working implement to a vehicle wherein the attachment mechanism can move the working implement laterally relative to the vehicle.

BACKGROUND

Many different types of working implements are attachable to skid steers and other vehicles. Often these working implements are driven by a supply of hydraulic fluid from the vehicle and can include augers, snow blowers, roto-tillers, mowers, etc. Typically, these working implements are attached to the front of the vehicle and centered in front of the vehicle. If an operator wants to direct the working implement to a certain spot, he or she drives the vehicle to that spot and aims the working implement, which is centered in front of the vehicle, at the spot the operator wants to direct the working implement to.

However, in some cases it may be desirable to be able to shift the working implement laterally and extend it beyond either side of the vehicle. For example, an operator of the vehicle may want to pass the working implement under a tree or other obstacle or an operator may find it easier to slowly shift the working implement laterally while the operator continues to drive the vehicle in a forward direction. In other cases, an operator may want to pass the working implement close to an obstacle, such as a building, ditch, etc. without driving the vehicle as close to the obstacle.

SUMMARY OF THE INVENTION

In one aspect, an attachment mechanism can be provided for shifting a working implement, such as a mower deck, laterally relative to a vehicle. The attachment mechanism can have a primary frame that is fixedly attachable to a vehicle, a secondary frame which is laterally moveable relative to the primary frame and an extension frame which is laterally moveable relative to the secondary frame. A working implement can be connected to the extension frame and the working implement extended beyond either side of the vehicle by moving the extension frame laterally relative to the secondary frame and the secondary frame laterally relative to the primary frame.

In another aspect, an attachment for laterally shifting a working implement can be provided. The attachment comprises: a primary frame having a first side and a second side, the primary frame connectable to the vehicle so that the primary frame extends substantially perpendicular to the vehicle; a secondary frame having a first side, a second side and moveably connected to the primary frame so that the secondary frame can move laterally relative to the vehicle; and an extension frame having a first side, a second side and moveably connected to the secondary frame so that the extension frame can move laterally relative to the vehicle.

DESCRIPTION OF THE DRAWINGS

A preferred embodiment of the present invention is described below with reference to the accompanying drawings, in which.

DETAILED DESCRIPTION OF THE ILLUSTRATED EMBODIMENTS

Figure 1:
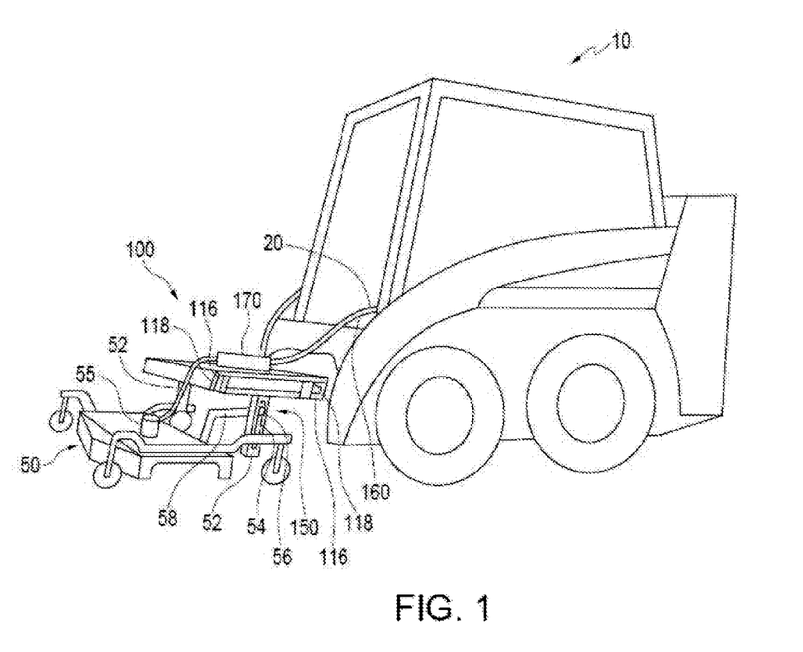
FIG. 1 is a perspective view of a vehicle using an attachment mechanism to couple a working implement to the vehicle.
Figure 2:
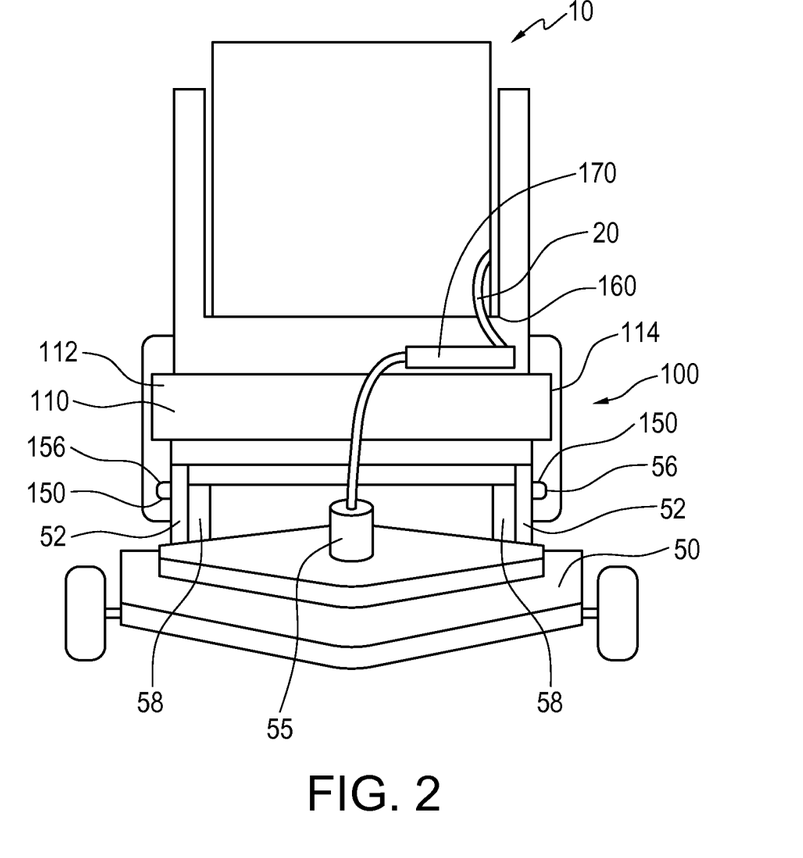
FIG. 2 is a front view of the vehicle and attachment mechanism shown in FIG. 1.

FIGS. 1 and 2 illustrate a vehicle 10, such as a skid steer, tractor, etc. with an attachment mechanism 100 used to couple a working implement 50 to the vehicle 10. The attachment mechanism 100 can be used to move the working implement 50 laterally relative to the vehicle 10 and allow the working implement 50 to be extended beyond the width of the vehicle 10.

Figure 3:
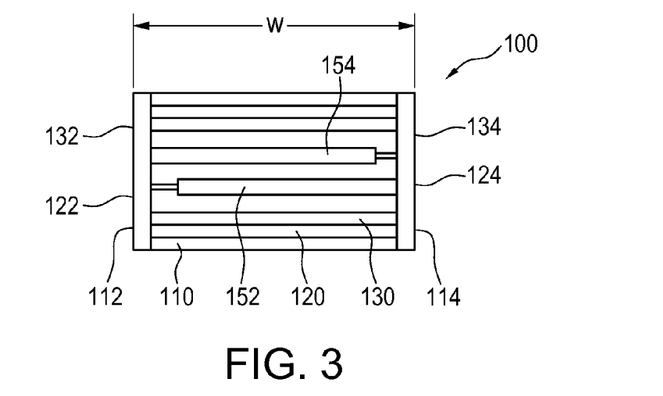
FIG. 3 is a top view of an attachment mechanism for laterally shifting a working implement relative to a vehicle.
Figure 4:
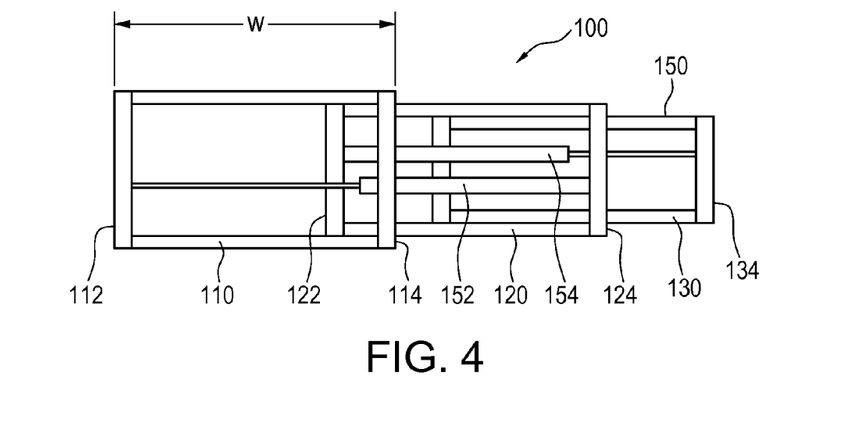
FIG. 4 is a top view of the attachment mechanism shown in FIG. 3 in an extended position.

FIGS. 3 and 4 illustrates the attachment mechanism 100 in one aspect. FIG. 3 illustrates the attachment mechanism 100 in a centered position and FIG. 4 illustrates the attachment mechanism 100 extended laterally to one side. The attachment mechanism 100 can have a primary frame 110, a secondary frame 120 and an extension frame 130. The primary frame 110 can be fixedly attachable to a vehicle (not shown) so that when the primary frame 110 is attached to a vehicle, the primary frame 110 will not move relative to the vehicle. The extension frame 130 can be attachable to a working implement (not shown), so that the working implement is moved with the extension frame 130. The primary frame 110, secondary frame 120 and extension frame 130 can be connected to each other so that the secondary frame 120 and extension frame 130 can be moved in relation to the primary frame 110 and allow the extension frame 130 (along with a working implement attached to the extension frame 130) to extend to one side of the primary frame 110.

The primary frame 110 can have a first side 112, a second side 114 and a width, W. In one aspect, the width, W, of the primary frame 110 can be substantially equally to the width of a vehicle the attachment mechanism 100 is attached to.

The secondary frame 120 can have a first side 122 and a second side 124 and can be attached to the primary frame 110 so that the secondary frame 120 can move relative to the primary frame 110. The secondary frame 120 can move relative to the primary frame 110 so that part of the secondary frame 120 can be extended beyond one side of the primary frame 110, with a portion of the secondary frame 120 being extendable beyond either the first side 112 of the primary frame 110, the second side 114 of the primary frame 110 or both. In this manner, the first side 122 of the secondary frame 120 can be extended beyond the first side 112 of the primary frame 110 or the second side 124 of the secondary frame 120 can be extended beyond the second side 114 of the secondary frame 120 (as shown in FIG. 4).

In one aspect, the secondary frame 120 can be slidably attached to the primary frame 110 so that the secondary frame 120 can slide laterally relative to the vehicle. In one aspect, this slidable attachment can be achieved by having roller wheels 116 attached to the secondary frame 120 running along a track 118 from in the primary frame 110.

The extension frame 130 can have a first side 132 and a second side 134 and can be attached to the secondary frame 120 so that the extension frame 130 can move laterally relative to the vehicle 10. An attachment point 150 can be provided on the extension frame 130 so that a working implement can be attached to the attachment point 150.

Figure 5:
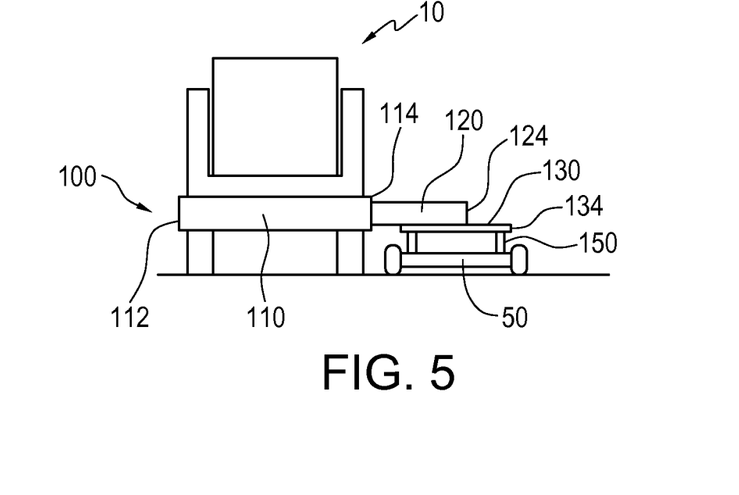
FIG. 5 is a front view of the vehicle and attachment mechanism shown in FIG. 2 with the attachment mechanism in a partially extended position.
Figure 6:
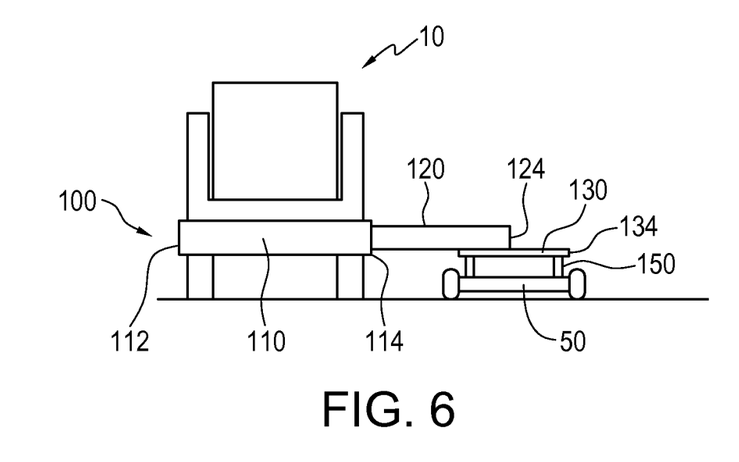
FIG. 6 is a front view of the vehicle of FIG. 5 with the attachment mechanism in a fully extended position.

Referring to FIGS. 2, 5 and 6 the attachment mechanism 100 can be used to move the working implement 50 laterally relative to the vehicle 10 while the vehicle 10 is in operation. The attachment mechanism 100 can be used to center the working implement 50 substantially in front of the vehicle 10, as shown in FIG. 2, or move the working implement 50 so that it extends past one of the sides of the vehicle 10 as shown in FIGS. 5 and 6. For example, the attachment mechanism 100 can be used to move the working implement 50 laterally so that it extends past the right side of the vehicle 10, or alternatively, the attachment mechanism 100 can be used to extend the working implement 50 laterally so that it extends past the left side of the vehicle 10 as shown in FIGS. 5 and 6.

In some aspects, the attachment mechanism 100 can be configured so that the working implement 50 can be extended to only one side of the vehicle 10. In other aspects, the attachment mechanism 100 can be configured so that the working implement 50 can be moved laterally to either side of the vehicle 10.

Referring again to FIGS. 3 and 4, in one aspect actuators 152, 154, such as hydraulic cylinders, can be used to control the movement of the secondary frame 120 and the extension frame 130. A first actuator 152, such as a double acting hydraulic cylinder, can be connected between the primary frame 110 and the secondary frame 120 to control the movement of the secondary frame 120 relative to the primary frame 110. A second actuator 154, such as a double acting hydraulic cylinder, can be connected between the secondary frame 120 and the extension frame 130. The second actuator 154 can be used to move the extension frame 130 relative to the secondary frame 120.

By supplying hydraulic fluid to the first actuator 152, the secondary frame 120 can be moved relative to the primary frame 110 using the first actuator 152. By using a double acting hydraulic cylinder for the first actuator 152, the secondary frame 120 can be extended past either side 112, 114 of the primary frame 110.

Referring to FIGS. 2, 3 and 4, commonly, skid steers and other vehicles that the attachment mechanism 100 can be used with have hydraulic connections 20 that can be used to supply hydraulic fluid to the attachment mechanism 100.

Hydraulics connections 160 provided on the attachment mechanism 100 can be used to connect to the hydraulic connections 20 on the vehicle 10 and route pressurized hydraulic fluid supplied by the vehicle 10 to the attachment mechanism 100 and thereby to the first actuator 152 and the second actuator 154 to control the motion of the secondary frame 120 and the extension frame 130.

In one aspect, if the working implement 50 attached to the attachment mechanism 100 can use a hydraulic motor 55 to power the working implement 50, a hydraulic splitter 170 can be provided. The hydraulic splitter 170 can be provided on the attachment mechanism 100 to split the hydraulics being supplied from the vehicle 10 between the actuators 152, 154 and the hydraulic motor 55 provided on the working implement 50. In this manner, the hydraulics supplied by the vehicle can be used to drive the hydraulic motor 55 on the working implement 50 and then some of the hydraulic fluid can be routed to the first actuator 152 and the second actuator 154 when the operator desires to extend or retract the working implement 50 attached to the attachment mechanism 100.

Figure 7:
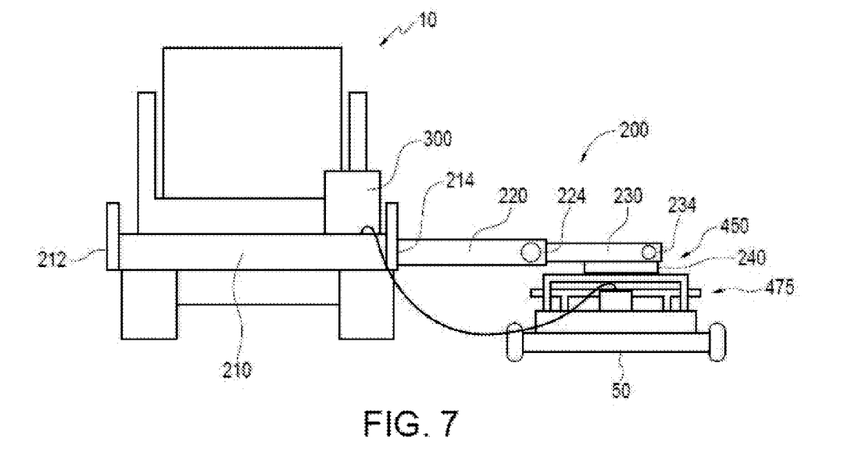
FIG. 7 is a front view of an attachment mechanism in a further aspect for laterally shifting a working implement relative to a vehicle using a chain drive.
Figure 8:
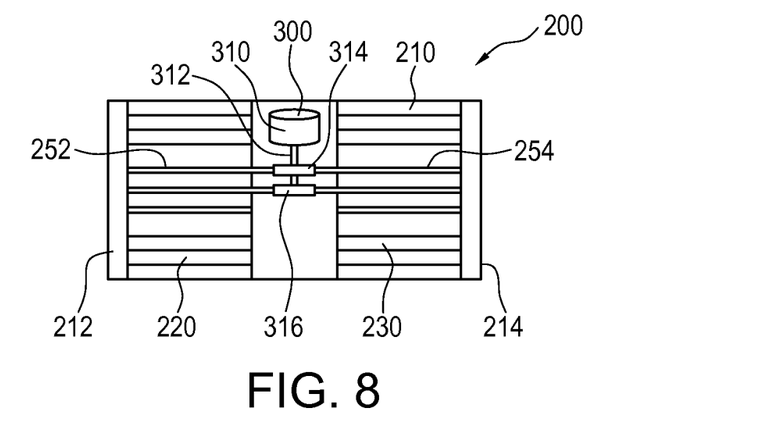
FIG. 8 is a top view of an attachment mechanism of FIG. 7.
Figure 9:
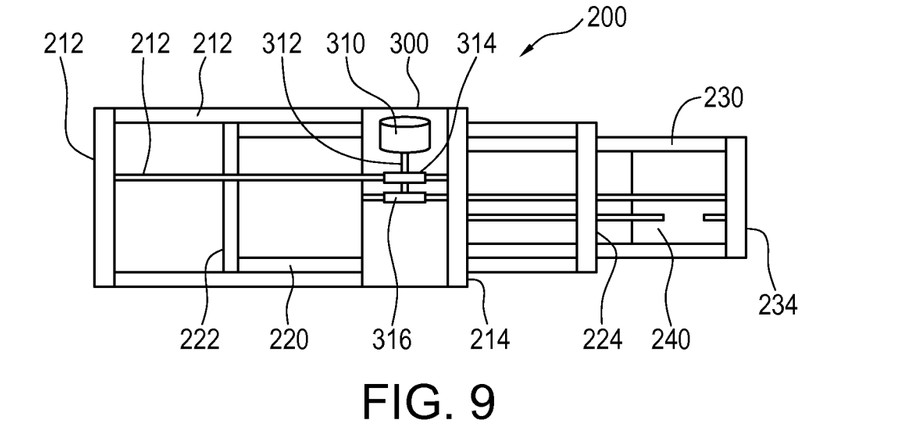
FIG. 9 is a top view of the attachment mechanism shown in FIG. 7 in an extended position.

Although the attachment mechanism 100 shown in FIGS. 1-6 uses hydraulic cylinders for the actuators, other types of actuators could be used. FIGS. 7-9 illustrate an alternate attachment mechanism 200 that uses actuators 252, 254 that are chain drives. In this attachment mechanism 200 there is a primary frame 210, a secondary frame 220, an extension frame 230 and a carrier 240. The primary frame 210 can include a first side 212 and a second side 214. The second frame 220 can have a first side 122 and a second side 124. The extension frame 230 can have a first side 232 and a second side 234.

When the attachment mechanism 200 is connected to the vehicle 10, the primary frame 210 remains positioned in front of the vehicle 10. The secondary frame 220 is moveably attached to the primary frame 210 so that the secondary frame 22 can move laterally relative to the vehicle 10. The extension frame 230 is moveably attached to the secondary frame 220 so that the extension frame 230 can move laterally relative to the vehicle 10.

A drive unit 300 can be fixedly attached to the secondary frame 220. The drive unit 300 can have a hydraulic motor 310 with two sprockets 314, 316 connected to the drive shaft 312 of the hydraulic motor 310. The hydraulic motor 310 can be driven by hydraulic fluid supplied from the vehicle 10.

A first chain 252 can be provided extending between the end rails 212, 214 of the primary frame 210. The first sprocket 314 of the drive unit 300 can mesh with the links of the first chain 252. When the drive unit 300 is used to rotate the first sprocket 314, the drive unit 300 and the secondary frame 220, which the drive unit 300 is fixedly attached to, is moved relative to the primary frame 210 along the first chain 252 and laterally relative to the vehicle 10. In this manner, the drive unit 300 can move the secondary frame 320 (which the drive unit 300 is attached to) relative to the primary frame 310 by rotating the first sprocket 314 along the first chain 252.

Idler gears (not shown) may be required to place the first chain 252 on the proper side of the first sprocket 314 and keep the first chain 252 positioned against the first sprocket 314.

The extension frame 230 can also be moved relative to the secondary frame 220 by the drive unit 300 and laterally relative to the vehicle 10. A second chain 254 can be provided extending between the end rails 232, 234 of the extension frame 230. The second sprocket 316 on the driveshaft 312 of the hydraulic motor 310 of the drive unit 300 can be mated to the second chain 316. By rotating the second sprocket 316 with the hydraulic motor 310, the extension frame 230 can be moved relative to the secondary frame 220. Unlike the relative movement of the primary frame 210 and the secondary frame 220, in which the drive unit 300 is attached to the secondary frame 220 and the drive unit 300 and secondary frame 220 move along the first chain 252 when the first sprocket 314 is rotated by the drive unit, the drive unit 300 stays in place relative to the secondary frame 220 and the rotation of the second sprocket 316 moves the second chain 254 and thereby the extension frame 230 relative to the drive unit 300 and the secondary frame 220.

Idler gears (not shown) may be required to position the second chain 254 on the proper side of the second sprocket 316 and keep the second chain 254 in contact with the second sprocket 316.

The carrier 240 can move relative to the extension frame 230, thereby further laterally shifting a working implement 50 connected to the carrier 240. The carrier 240 is movable attached to the extension frame 230 such that the carrier 240 can move between the end rails 232, 234 of the extension frame 230.

Figure 10:
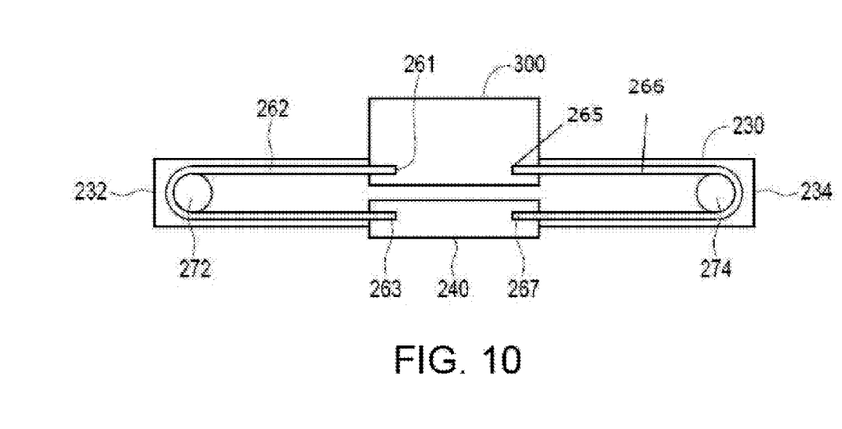
FIG. 10 is a schematic illustration of a chain drive for moving a carrier of the attachment mechanism shown in FIG. 7.

FIG. 10 illustrates the movement of the carrier 240 relative to the drive unit 300 and the extension frame 230. A first chain 262 is connected at a first end 261 to the drive unit 300 and then passes around an idler gear 272 provided proximate the first end rail 232 of the extension frame 230 before being connected at a second end 263 to the carrier 240. In a similar matter, a second chain 266 is connected at a first end 265 to the drive unit 300 then passes around an idler gear 274 provided proximate the second end rail 234 of the extension frame 230 before being connected at a second end 267 to the carrier 240.

The carrier 240 is moved relative to the extension frame 230 when the extension frame 230 is moved laterally relative to the secondary frame 220 by the drive unit 300. When the drive unit 300 is used to move the extension frame 230 to the right relative to the secondary frame 220 (as shown in FIG. 5), the second side rail 234 of the extension frame 230 moves away from the drive unit 300 where it is connected to the secondary frame 220. This causes the second chain 266 to pull the carrier 240 towards the second side 234 of the extension frame 230. At the same time, the first side 232 of the extension frame 230 is moved towards the drive unit 300, allowing the carrier 240 to pull the second end 267 of the first chain 266 towards the second side 234 of the extension frame 230. When the attachment mechanism 200 is moved back into its initial position, the first side 232 of the extension frame 230 will move away from the drive unit 300. This will cause the first chain 262 to pull the carrier 240 back towards the drive unit 300.

In the same, manner the first chain 262 and the second chain 264 can move the carrier 240 towards the first side 232 of the extension frame 230 when the secondary frame 220 and the extension frame 230 are moved laterally to the left side of the skid steer 10. When the extension frame 230 is moved to the left by the drive unit 300, the first chain 262 can pull the carrier 240 towards the first side 232 of the extension frame 230. The second chain 266 allows the carrier 240 to move towards the first side 232 of the extension frame 230. When the extension frame 230 is moved back towards the secondary frame 220, the second chain 266 can pull the carrier 240 back towards the center of the extension frame 230.

Referring again to FIGS. 1 and 2, the attachment point 150 can be provided on the extension frame 130 of the attachment mechanism 100. In one aspect, the attachment point 150 can be a floating connection between the extension frame 130 and the working implement 50 allowing the working implement 50 to track along a ground surface. The attachment mechanism 100 can be configured to attach to the vehicle 10 so that the primary frame 110, secondary frame 120 and the extension frame 130 are positioned approximately horizontally and spaced above the ground surface.

The attachment point 150 can comprise two members 52 extending downwards from the extension frame 130. Each member 52 can have an elongated slot 54 passing through the member 52. An attachment point 150 on the working implement 50 can be provided with a shaft 56 that passes through the elongated slot 54 of the member 52. The shaft 56 can be connected to a secondary member 58 that is fixedly attachable to the working implement 50. In this manner, the working implement 50 which is connected to the attachment point 150 can move vertically relative to the extension frame 130 with the shafts 56 on each member 52 passing through the elongated slots 54 in the members 52. In this manner, the attachment mechanism 100 can remain at substantially one vertical position while the vehicle 10 and working implement 50 are in use. While the attachment mechanism 100 remains at one vertical position, the working implement 50 that is travelling along the ground surface can move vertically relative to the attachment mechanism 100 or "float" relative to the attachment mechanism 100.

A quick attach connection can also be used to allow the operator to quickly attach and detach a working implement 50 from the extension mechanism 200 without requiring the operator to leave cab of the vehicle 10. FIG. 7 illustrates the carrier 240 having a quick attach connection 450 for connecting the extension mechanism 200 to the working implement 50.

Figure 11A:
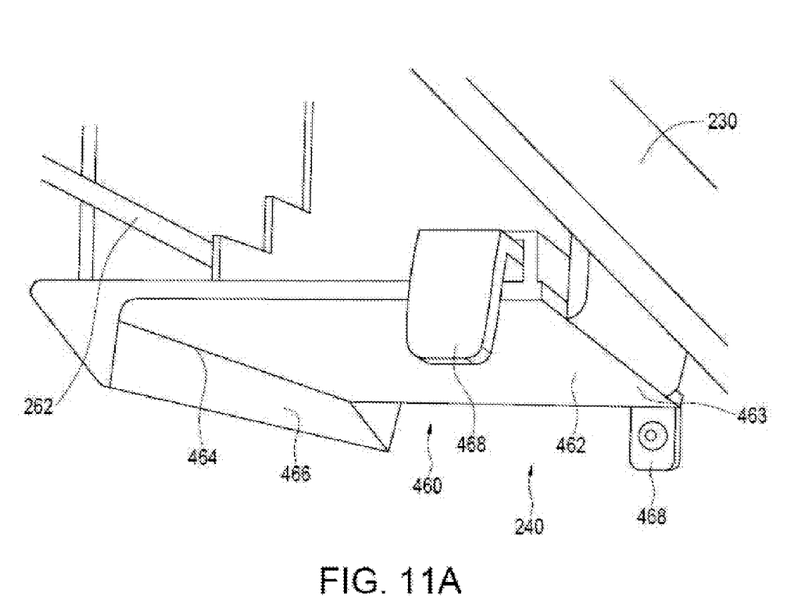
FIG. 11A is a schematic illustration of a first connection of a quick attach connection provided on the attachment mechanism.

Referring to FIG. 11A, the quick attach connection 450 can have a first connection 460 provided on the carrier 240. The first connection 460 can have a flat surface 462 with an front 463 and a back 464. A recess 466 can be provided at the back 464 of the flat surface 462. Hydraulically powered pins 468 can be provided proximate the front 463 of the surface 462.

Figure 11B:
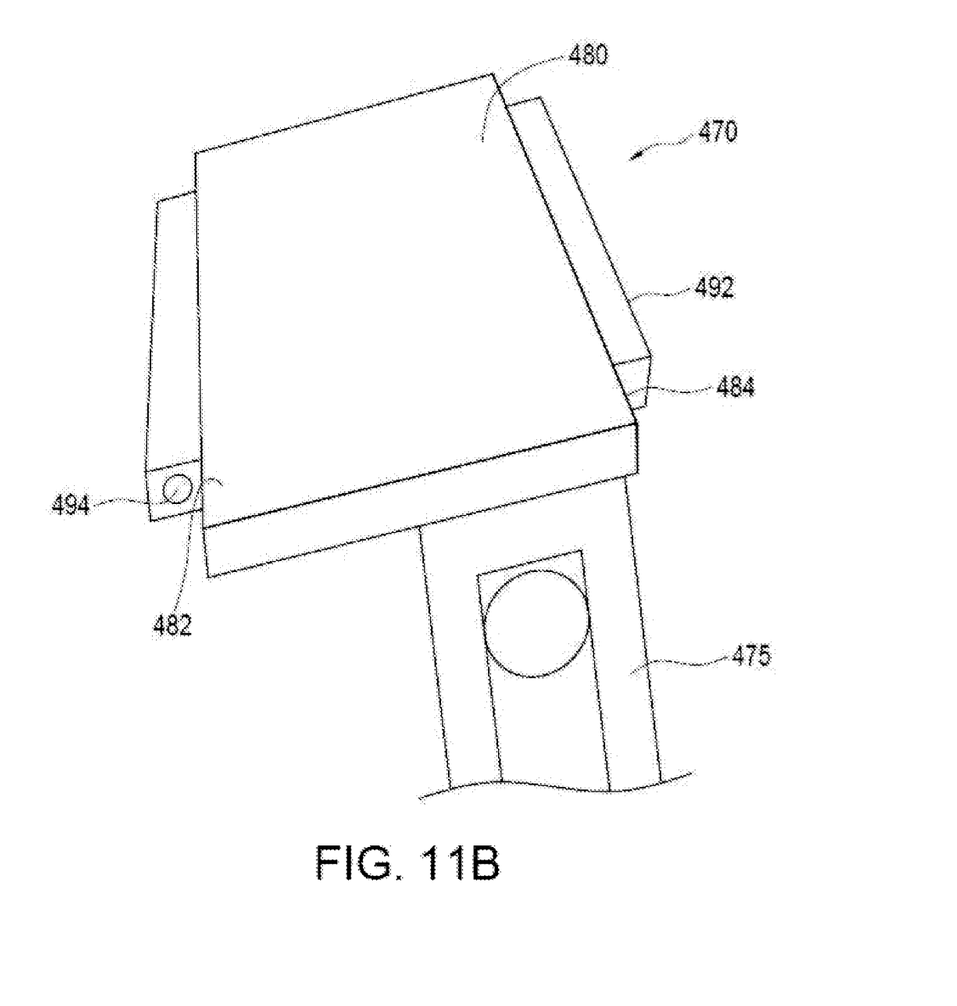
FIG. 11B is a schematic illustration of a second connection of a quick attach connection provided on the working implement.

Referring to FIG. 11B, a second connection 470 of the quick attach connection 450 can be provided on the working implement 50 to connect to the first connection 460 on the carrier 240. The working implement 50 can have a frame 475 that allows the working implement 50 to be connected to the attachment mechanism 200. The second connection 470 can be provided on the top of the frame 475 and able to connect to the first connection 460 to connect the working implement 50 to the attachment mechanism 200.

Referring to FIGS. 11A and 11B, the second connection 470 can have a mounting surface 480 that mates with the flat surface 462 of the first connection 460 on the carrier 254. The mounting surface 480 can have a front 482 and a back 484. A ridge 492 can be provided at the back 484 of the mounting surface 480 and be mateable with the recess 466 on the first connection 460. Two apertures 494 can be positioned at the front 482 of the mounting surface 480 that align with the pins 468 on the first connection 460 when the flange 492 is positioned in the recess 466.

In operation, an operator of the vehicle 10 could relatively quickly and easily attach and detach a working implement 50 from the attachment mechanism 200. To attach the working implement 50, the operator could maneuver the vehicle 10 until the first connection 260 and the second connection 270 are aligned, with the flat surface 462 of the first connection 460 positioned against the mounting surface 480 of the second connection 470. The operator can then move the attachment mechanism 200 forward until the ridge 492 is inserted in the recess 466 on the first connection 460. With the ridge 492 in place in the recess 466, the operator can route hydraulic fluid to the pins 468 to cause the pins 468 to be inserted in the apertures 494 on the second connection 470 thereby connecting the working implement 50 to the attachment mechanism 200. To detach the working implement 50 from the attachment mechanism 200, the operator can simply route hydraulic fluid to the pins 468 so that the pins 468 are retracted from the apertures 494 and back up the vehicle 10 to cause the ridge 492 to retract from the recess 466 and thereby causing the working implement 50 to detach from the attachment mechanism 200.

In one aspect, the working implement 50 can be a mower deck. An operator can mow grass, etc. by driving the vehicle 10 with the attachment mechanism 100 in the centered position as shown in FIG. 2. When the operator wants to extend the mower deck past either side of the vehicle 10, such as when the operator wants to mow under a tree or obstacle or does not want to drive the vehicle 10 too close to an object, the operator can use the attachment mechanism 100 to extend the mower deck to either side of the vehicle 10.

Figure 12:
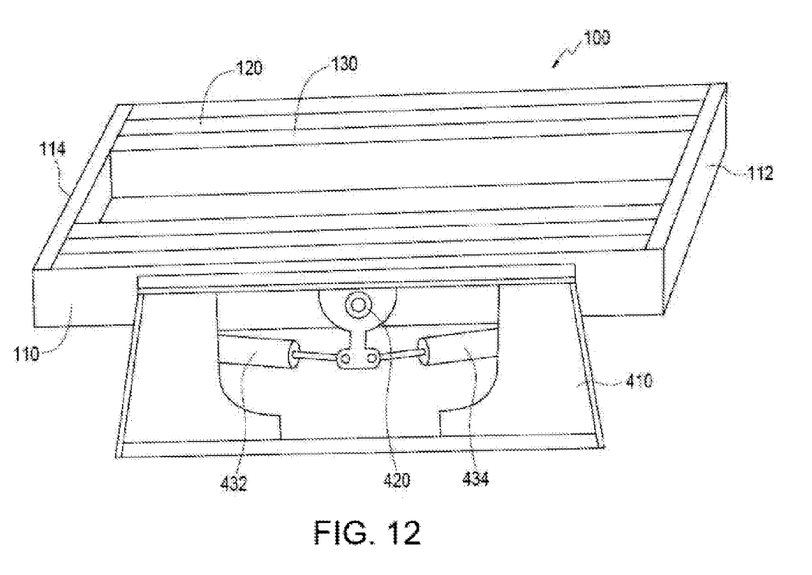
FIG. 12 is a schematic illustration of a pivotal attachment for the skid steer.

Referring to FIG. 12 in one aspect, the attachment mechanism 100 can be attached to the vehicle 10 so that the attachment mechanism 100 can be pivoted relative to the vehicle 10, allowing an operator to tilt the attachment mechanism 100 and thereby a working implement 50 attached to the attachment mechanism 100. An attachment plate 410 can be provided for connecting the attachment mechanism 100 to the vehicle 10. The attachment plate 410 can be pivotally connected to the attachment mechanism 100 by a pivotal connection 420. In one aspect, the attachment plate 410 can be pivotally attached to the primary frame 110 of the attachment mechanism 100.

Hydraulic cylinders 432, 434 can be connected between the attachment mechanism 100 and the attachment plate 410. If the attachment plate 410 is pivotally connected to the primary frame 110 of the attachment mechanism 100, the hydraulic rams 432, 434 can be connected between the attachment plate 410 and the primary frame 110.

By directing hydraulic fluid to the hydraulic cylinders 432, 434, the hydraulic cylinders 432, 434 can pivot the attachment mechanism 100 relative to attachment plate 410. In this manner, when the attachment mechanism 100 is in use, the vehicle operator can use the hydraulic cylinders 432, 434 to pivot the attachment mechanism 100 relative to the vehicle. This can be useful in a number of situations, including allowing the operator of the vehicle to use an implement attached to the attachment mechanism 100 on a slope while the vehicle remains on relatively level ground (e.g. allowing an operator to the sides of a ditch while the vehicle stays our of the ditch).

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

The invention claimed is:

1. An attachment for laterally shifting a working implement, the attachment comprising:
   a primary frame having a front end, a back end, a first side and a second side, the primary frame adapted for connection to the vehicle at the back end of the primary frame so that the primary frame extends substantially perpendicular to the vehicle and the primary frame extends substantially horizontally from the back end to the front end;
   a secondary frame having a first side, a second side and moveably connected to the primary frame so that the secondary frame can move laterally relative to the vehicle;
   an extension frame having a first side, a second side and moveably connected to the secondary frame so that the extension frame can move laterally relative to the vehicle; and
   an attachment point provided on the extension frame, the attachment point adapted for attaching a mower deck to a bottom of the extension frame so that the mower deck is positioned below the attachment so that the mower deck is movable vertically relative to the extension deck,
   wherein a mounting plate is pivotally attached to the back end of the primary frame and adapted for connection to the vehicle such that the mounting plate can tilt the primary frame, secondary frame and extension frame relative to the vehicle.

2. The attachment of claim 1 wherein the second side of the secondary frame is extendable past the second side of the primary frame.

3. The attachment of claim 2 wherein the second side of the extension frame is extendable past the second side secondary frame.

4. The attachment of claim 1 wherein the secondary frame is slidably attached to the primary frame.

5. The attachment of claim 1 further comprising an actuator positioned between the primary frame and the secondary frame to move the secondary frame relative to the primary frame.

6. The attachment of claim 1 further comprising an actuator positioned between the secondary frame and the extension frame to move the extension frame relative to the primary frame.

7. The attachment of claim 5 wherein the actuator is a hydraulic cylinder.

8. The attachment of claim 6 wherein the actuator is a hydraulic cylinder.

9. The attachment of claim 1 wherein a chain drive moves the secondary frame relative to the primary frame and the extension frame relative to the secondary frame.

10. The attachment of claim 9 further comprising:
    a first chain provided across the primary frame;
    a second chain provided across the secondary frame;
    a drive unit having a hydraulic motor;
    a first sprocket meshing with the first chain; and
    a second chain meshing with the second sprocket.

11. The attachment of claim 10 further comprising a carrier movably attached to the extension frame to move laterally relative to the vehicle and wherein the attachment point is provided on the carrier.

12. The attachment of claim 11 further comprising a first chain connected between the drive unit and the carrier and running through an idle gear positioned proximate the first side of the extension frame and a second chain connected between the drive unit and the carrier and running through a second idle gear positioned proximate the second side of the extension frame.

13. The attachment of claim 1 further comprising a least one hydraulic cylinder connected between the mounting plate and the primary frame to pivot the primary frame relative to the vehicle.

14. The attachment of claim 3 wherein the primary frame, secondary frame and extension frame are positioned substantially horizontally when the attachment mechanism is attached to a vehicle.

15. The attachment of claim 1 further comprising a carrier movably attached to the extension frame, the carrier attachable to the working implement.

16. The attachment of claim 1 wherein the attachment is pivotally connectable to the vehicle.

17. The attachment of claim 1 wherein the working implement is releasably attachable to the attachment.

18. The attachment of claim 17 further comprising a quick attach connection having a first connection provided on the attachment and a second connection provided on a frame connected to the working implement.

19. The attachment of claim 18 wherein the first connection has a recess at the back of the first connection for mating with a ridge on the second connection, and wherein the first connection has a pair of pins proximate a front end of the first connection for insertion in apertures in the second connection, and wherein when the ridge of the second connection is inserted in the recess of the first connection and the pins of the first connection are inserted in the apertures of the second connection, the working implement is operably attached to the attachment.

* * * * *